United States Patent [19]

Pierce, Jr.

[11] 4,237,515

[45] Dec. 2, 1980

[54] PROTECTIVE ELECTRICAL DISCHARGE DEVICE

[75] Inventor: Thomas V. Pierce, Jr., Monroeville, Pa.

[73] Assignee: American Standard Inc., Swissvale, Pa.

[21] Appl. No.: 21,521

[22] Filed: Mar. 19, 1979

[51] Int. Cl.³ .............................................. H02H 9/06

[52] U.S. Cl. .................................................... 361/127

[58] Field of Search ................................ 361/126-128; 313/203, 231, 231.1

[56] References Cited

U.S. PATENT DOCUMENTS

| | | | |
|---|---|---|---|
| 2,309,183 | 1/1943 | Gilson et al. | 361/127 X |
| 2,415,945 | 2/1947 | Gilson | 361/126 X |
| 2,907,910 | 10/1959 | Marsteller | 361/126 X |
| 2,923,849 | 2/1960 | Rees | 361/126 X |
| 3,204,322 | 9/1965 | Rees | 361/126 X |

*Primary Examiner*—Harry E. Moose, Jr.

*Attorney, Agent, or Firm*—A. G. Williamson, Jr.; R. W. McIntire, Jr.

[57] ABSTRACT

A varistor disc is press-fitted into recesses formed in opposite surfaces of two metal electrodes, its length selected so that a predetermined air gap remains between the electrode surfaces in parallel to the varistor path. The assembly is held by a rivet inserted through the three elements with a spring cup washer under the peened rivet end to absorb dynamic discharge forces. The rivet is insulated by a nylon tube integral with a dust and moisture cover, held at one end by the rivet head and open at its other end for release of gas and particles upon discharge. The varistor dissipates static voltage buildup and low voltage surges. High voltage causes arcing between varistor and electrodes within the air gap, which creates a surge discharge across the air gap between electrodes to dissipate surge energy and protect the varistor element.

7 Claims, 3 Drawing Figures

PROTECTIVE ELECTRICAL DISCHARGE DEVICE

BACKGROUND OF THE INVENTION

My invention pertains to a protective electrical discharge device. More specifically, the invention relates to a lightning arrester for protecting low voltage circuits, e.g., railroad signaling circuits and/or apparatus, against voltage surges, particularly from lightning during electrical storms.

Railroad signaling circuits in particular are exposed to the hazards of electrical storms so that, to maintain proper and safe operation, they require adequate protection against voltage surges due to lightning and other external causes. Protective electrical discharge devices, e.g., lightning arrestors of various types and using various materials, for both line-to-line and line-to-ground protection, have long been used to protect such low voltage circuits and apparatus. The advantages of employing varistors, i.e., non-linear resistors, for protection of electronic circuits against surges and transients caused by lightning or electrical power switching and faults have also been recognized. These advantages include, but are not limited to, fast response time and the ability to slowly dissipate static charge buildup. A major problem in the use of varistors has been their relatively low energy/volume ratio, necessitating very large and expensive varistors in those applications where the varistor is exposed to very large energy surges. A method or arrangement whereby smaller, less expensive varistor elements can be used will thus provide operational and cost advantages.

Accordingly, an object of my invention is an improved protective electrical discharge device using a varistor element.

Another object of the invention is a lightning arrester incorporating a varistor element which is paralleled by an air gap.

A further object of my invention is an electrical surge protector device in which low voltage surges are dissipated or passed by a low energy varistor element which is supplemented for higher voltage surges by a parallel air gap which passes the large energy levels to protect the varistor element from damage.

Yet another object of the invention is a low voltage lightning arrester device in which a varistor element, press-fitted into recesses in opposing surfaces of metal electrodes to establish a predetermined air gap, passes static voltage buildup and low voltage surges until the surge voltage buildup causes the surge energy to be passed by the air gap, from metal-to-metal surface, so that the bulk of the surge current is shunted away from the varistor.

Other objects, features, and advantages of my invention will become apparent from the following specification and appended claims when taken in connection with the accompanying drawings.

SUMMARY OF THE INVENTION

In practicing the invention, each of two heavy metal electrodes is provided with a recess in one surface. Each electrode is also drilled for mounting on an insulated rod or shaft with the recessed surface opposite. A varistor element, of a size and shape to be press-fitted into each recess, is also prepared for mounting on the insulated rod. The length of the varistor element is selected so that, when press-fitted to the bottom of each recess, the electrodes are spaced a selected distance apart. In other words, an air gap of predetermined length is formed between the opposite surfaces of the metal electrodes. The entire combined structure is held in position by the central rod, specifically in the form of a rivet and spring cup combination. The spring cup, held against the outer surface of one electrode by the peened end of the rivet, absorbs the dynamic forces created during a surge discharge and assures continued contact between varistor and electrodes. The rivet is insulated from the electrode and varistor assembly by a plastic, e.g., nylon, sleeve or tube which is an integral part of an open-ended dust and moisture cover shielding the assembly and held in place by the rivet head at the closed end. The rivet also connects an external connector or terminal to the outer surface of each electrode.

When this device is connected as a line-to-line protector across the protected apparatus to dissipate input voltage surges, the varistor element, when a static or surge buildup exceeds its predetermined voltage characteristic, passes a rapidly increasing current level as the voltage increases. Arcing then occurs within the air gap between the exposed varistor and metal electrode surfaces. This initiates a breakdown, i.e., direct current flow, between the electrode surfaces across the air gap and dissipates the high voltage energy surge without damage to the varistor.

BRIEF DESCRIPTION OF THE DRAWINGS

Prior to defining the invention in the appended claims, I will describe a specific, preferred embodiment as illustrated in the accompanying drawings, in which:

In each of the drawing figures, similar reference characters designate the same or similar parts of the apparatus.

DESCRIPTION OF THE ILLUSTRATED EMBODIMENT

Figure 1A:
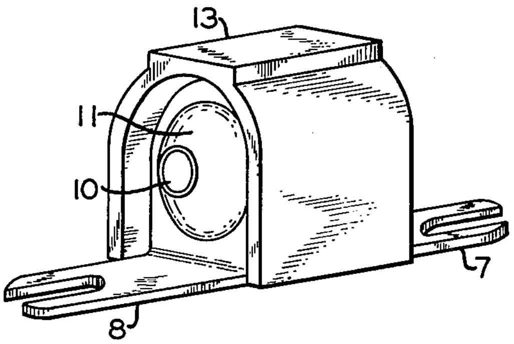
FIG. 1A is a perspective view of the protective device or lightning arrester provided by the invention looking toward the open end of the dust and moisture cover.
Figure 1B:
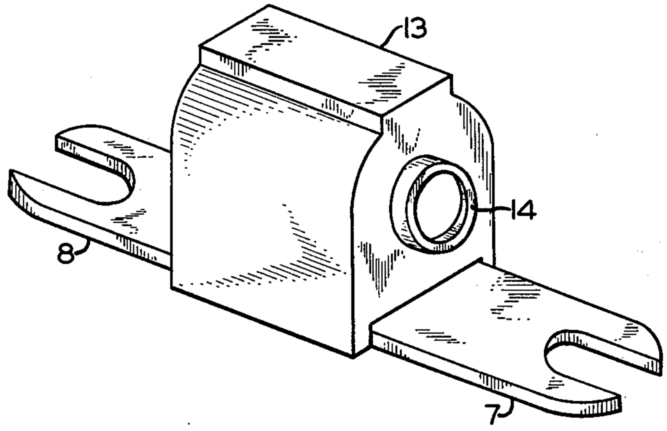
FIG. 1B is a similar perspective view of the lightning arrester looking toward the closed end of the cover.

Referring to FIGS. 1A and 1B, general perspective views are shown (not necessarily to the same scale) of the preferred form of the protective electrical discharge device, commonly a lightning arrester, provided by the invention. The specific details of the invention are not shown in these two views but will be described in connection with FIG. 2. To be noted are the external connectors or bus terminal bars 7 and 8 which are designed for mounting the device in a standard terminal block in a manner shown in FIGS. 1 and 2 of the U.S. Pat. No. 2,907,910, issued Oct. 6, 1959 to L. O. Marsteller. The dust and moisture cover 13 is shown as closed at one end (FIG. 1B) and open at the other end (FIG. 1A) to allow the escape of gas and particles resulting from a surge discharge.

Figure 2:
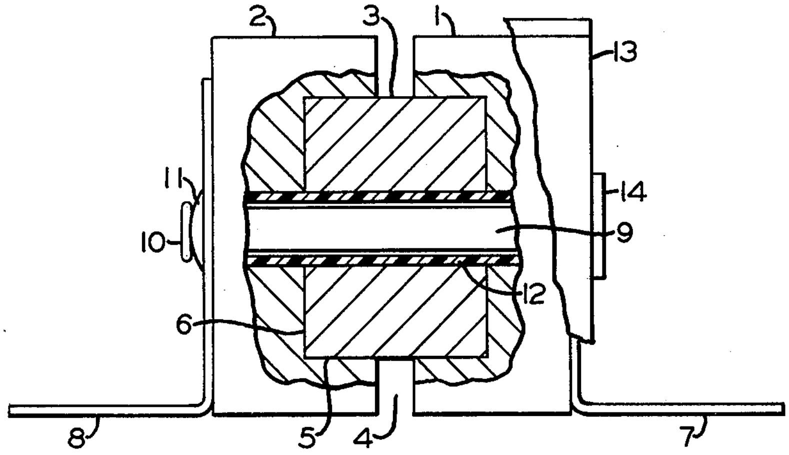
FIG. 2 is a schematic view, partly in cross-section, of the side elevation of the lightning arrester embodying the invention.

Referring to FIG. 2, the major elements of the lightning arrester are the heavy metal electrodes 1 and 2, e.g., of brass, and a varistor block 3. The preferred form or shape of each of these three items is cylindrical, although such is not an absolute requirement. An opening or circular recess is formed in one surface of each electrode 1, 2, as defined by the edges such as 5 and 6. The varistor element 3 is inserted in each of these recesses, its selected length being such that a predetermined air gap 4 is maintained between the opposite surfaces of electrodes 1 and 2. The varistor cylinder is oversized with respect to the recesses in the brass electrodes so that assembly must be accomplished by pressing the varistor into the openings with high pressure. This action causes a small amount of the brass metal along the recess walls, reference 5, to be sheared off and deposited within the grain of the varistor material. This result, being the equivalent of metallizing the varistor surface, yields excellent electrical contact along the sides of the varistor. Good electrical contact is also made at the end faces of the varistor, reference 6, due to the high pressure of the assembly.

The electrodes 1, 2 and varistor 3 are each drilled so that the assembly may be held in place, as well as connected to the external contacts 7 and 8, by a rod, i.e., the rivet 9, passing through these elements. This rivet has its peened end 10 formed against a spring cup washer 11 such that assembly pressure is maintained while permitting the partial absorption of dynamic loads resulting from large surge currents. The body of the rivet is insulated from the electrode and varistor assembly by a nylon tube 12 which is an integral part of the nylon cover 13 (shown only partially in this cut-away view), which is held firmly to the entire assembly by the head 14 of the rivet seated in a recessed boss. This nylon cover has the desirable properties of absorbing large dynamic loads without shattering and of not readily supporting combustion. As illustrated in FIG. 1A, cover 13 is open at the other end (left in FIG. 2) to allow escape of gas and dust resulting from surge discharges.

In operation, the device presents a fairly high impedance to applied voltages below the "knee" of the varistor characteristic V-I curve. Voltages, whether due to static buildup or surges, above the varistor "knee" are passed through the varistor, with conduction rapidly increasing as the voltage increases. Before the conduction exceeds the capacity of the varistor, arcing, facilitated by the grain structure of the varistor, occurs between the surface of the varistor exposed within the air gap and the surface of at least one of the brass electrodes. This arcing produces ionization products within the air gap which initiate breakdown between the opposing faces of the brass electrodes. The bulk of the surge current is then shunted away from the varistor, which thus does not have to carry a high current, i.e., a large energy volume, during discharge under high voltage surges. It does, however, protect sensitive equipment by shunting lower voltage surges quickly and readily. Although the emphasis herein is on line-to-line protection of sensitive equipment, the disclosed arrester may also be connected line-to-ground to dissipate such voltage surges at lower levels.

The protective electrical discharge device described thus comprises suitable component parts so arranged that normal varistor action occurs during low voltage surges. However, during high voltage surges, the majority of the energy is shunted away from the varistor element by the parallel air gap. The arrester device thus provides high voltage surge protection yet protects from damage a small, inexpensive, low energy varistor element used to retain the fast response time and static charge dissipation benefits of such material. An economic and efficient lightning arrester is thus provided.

Although I have herein shown and described but one form of a lightning arrester embodying the invention, it is to be understood that various changes and modifications therein may be made, within the scope of the appended claims, without departing from the spirit and scope of the invention.

Having thus described the invention, what I claim as new and desire to secure by Letters Patent, is:

1. A protective electrical discharge device comprising:

(a) a pair of conductive electrodes, each with a recess formed in one surface and drilled for mounting on a central shaft with recessed surfaces facing each other, (b) a block of varistor material having a predetermined voltage characteristic for high conductivity and a length longer by a selected distance than the sum of the depth of both recesses in said electrodes, (1) said varistor block drilled for assembling in line with said electrodes on a central shaft and further sized for press-fitting into each recess to space said electrodes by an air gap equal to said selected distance, (c) an insulated shaft and spring structure inserted through said electrodes and varistor as a mounting shaft for retaining the assembly in position with said selected distance air gap, and (d) a pair of electric terminals positioned one against each electrode outer surface for forming an electrical discharge path through said electrode and varistor assembly with said air gap in parallel with said varistor block whereby a voltage potential greater than said predetermined characteristic applied across said terminals initially discharges through said varistor block and subsequently discharges through said parallel air gap.

2. A protective discharge device, as defined in claim 1, in which, (a) said electrodes and varistor elements each have a cylindrical form with said varistor having a smaller diameter than said electrodes, (b) said insulated shaft and spring structure includes a single head insulated rivet and a spring cup washer, (c) said insulated rivet is inserted through said electrode and varistor assembly with its head insulated from and holding the terminal at one end of said assembly connected to the associated electrode, said rivet peened at its other end to retain said assembly in position, and (d) said spring cup washer is retained against the other terminal under said peened end of said rivet for providing a firm electrical contact between the elements of said discharge path and for absorbing dynamic shock of discharge.

3. A protective discharge device, as defined in claim 2, which further includes, (a) a nonflammable, shock resistant, insulating cover device, open at one end, shaped to fit over said cylindrical assembly, and held by said rivet head for protecting said assembly from dust and moisture, said open end allowing the escape of surge discharge products from the enclosure, and (b) a central tube integral with said cover for insulating said rivet from said assembly and at least one terminal.

4. A protective discharge device, as defined in claim 3, in which said cover and integral insulating tube are formed of nylon material.

5. A lightning arrester comprising:
(a) a pair of cylindrical metallic electrodes, each having a circular recess formed in one surface,
(b) a cylindrical varistor sized for press-fitting into each electrode recess to form an electric circuit path through said electrodes and varistor,
  (1) the length of said varistor cylinder being selected to create an air gap between the opposing electrode surfaces of predetermined length and in parallel electrically with said varistor,
  (2) said circuit path having a greatly reduced resistance at applied voltages above a predetermined voltage characteristic of said varistor,
(c) an insulated rivet and spring means inserted through the assembled electrodes and varistor for retaining the assembly in position and for absorbing dynamic discharge forces, and
(d) a pair of circuit contacts, one positioned by said rivet means to contact an external surface of each electrode for completing a discharge circuit between said contacts through which voltage surges above said predetermined voltage characteristic are initially dissipated through said varistor, and at increased voltage are subsequently dissipated through said air gap.

6. A lightning arrester, as defined in claim 5, which further includes,
(a) a non-conducting shield held in place by said rivet and shaped to cover said assembly for protecting against dirt and moisture, said shield open at one end to allow escape of the products of voltage surge discharge,
(b) said shield including an integral central sleeve for insulating said rivet from said electrode and varistor assembly.

7. A lightning arrester, as defined in claim 6, in which said shield and integral central sleeve are made of nylon.

* * * * *